United States Patent [19]

Grande

[11] 4,076,163
[45] Feb. 28, 1978

[54] COUPLER DEVICE

[76] Inventor: Edvard Grande, 506 Highland Drive, Beckley, W. Va. 25801

[21] Appl. No.: 714,102

[22] Filed: Aug. 13, 1976

[51] Int. Cl.$^2$ ............................................. B23K 23/00
[52] U.S. Cl. ....................................... 228/56; 403/267; 403/272; 403/300; 164/333
[58] Field of Search ................... 228/56, 241; 164/108, 164/110, 111, 333, 334; 249/97; 403/267, 268, 272, 300

[56] References Cited

U.S. PATENT DOCUMENTS

| 2,569,956 | 10/1951 | Schilknecht | 228/241 X |
| 3,192,080 | 6/1965 | Cooper | 164/333 X |
| 3,234,603 | 2/1966 | Leuthy et al. | 164/111 X |
| 3,255,498 | 6/1966 | Leuthy et al. | 164/111 X |
| 3,860,062 | 1/1975 | McMurray et al. | 164/333 |

*Primary Examiner*—Donald G. Kelly
*Assistant Examiner*—K. J. Ramsey
*Attorney, Agent, or Firm*—William Nitkin

[57] ABSTRACT

An improved thermite-type coupler for the splicing of bar-like structures such as reinforcement bars, of the type having an outer sleeve; an inner sleeve located within the outer sleeve; two collar members, each joining one end of the outer sleeve to one end of the inner sleeve; the area defined between the inner sleeve and the outer sleeve containing a thermite-type mixture and the area within the inner sleeve forming an annular space utilized for insertion of the ends of two bar-like structures, including means for igniting the thermite-type mixture and means for allowing the thermite-type reaction products after ignition to enter the annular space under pressure thereby, upon solidification, splicing the bar-like structures together having the improvement wherein the means for allowing the thermite-type reaction products afer ignition to enter the annular space comprises the inner sleeve having a multiplicity of perforations distributed over its surface. Other embodiments include: an inner sleeve containing tapered perforations; a sleeve member affixed to the inner sleeve within the annular space; and an inner sleeve containing a multiplicity of cavities.

4 Claims, 5 Drawing Figures

COUPLER DEVICE

BACKGROUND OF THE INVENTION

This invention relates to a device for the coupling of barlike structures and more particularly relates to an apparatus for splicing concrete reinforcement bars.

The splicing of bar-like structures and more particularly the splicing of reinforcement bars utilized in concrete construction has been accomplished in the past by a variety of means. One such means has been butt welding done on an individual basis by hand. This method has several disadvantages in that it is slow, expensive and the welding requires frequent quality inspection. Mechanical splices have also been utilized for the splicing of reinforcement bars. A typical mechanical splicing device is disclosed in U.S. Pat. No. 3,234,603 where a sleeve is placed around both ends of the bars to be joined and ancillary equipment is utilized to force molten metal into the sleeve thereby binding the bars together. A disadvantage of this mechanical splicing device is that it requires extensive ancillary equipment to be utilized to accomplish each splice.

A newer splicing device eliminating the need for ancillary equipment is a thermite-type coupler whose splice is based on a thermite-type-fueled exothermic reaction. Such thermite-type reaction usually occurs when a metallic oxide such as iron oxide or equivalent and a very active metal such as aluminum or equivalent are ignited forming, for example, a highly super-heated liquid iron and aluminum oxide slag. It should be noted that Thermit is listed as a trademark for metal compounds for welding, but your applicant's description of a thermite-type mixture is not limited to only the mixture as may be described under this trademark but includes any suitable material to produce a similar exothermic reaction. The coupling apparatus is comprised of an outer sleeve which is joined at its ends by collar members to an inner sleeve, the area defined between these sleeves being packed with a thermite-type mixture. The ends of two bars to be spliced are inserted into the inner sleeve and butted together. Fuse means extending through the outer sleeve into the thermite-type mixture holding area is used to ignite the thermite-type mixture. Ignition causes the reaction products to blow through one or several entry holes in the inner sleeve into the annulus between the reinforcement bars and the inner sleeve wherein the reaction products solidify around the bars thereby splicing the bars together along with the coupler.

There are many important factors to be considered when using a thermite-type coupler. First, the amount of the thermite-type mixture must be properly determined as too much thermite-type mixture will cause the inner sleeve to erode along the reinforcement bars as the thermite-type mixture blows out between the inner sleeve and the reinforcement bars. Alternatively, if too little thermite-type mixture is used, a splice of insufficient strength results. It has been found that air entrapped in the packing of the thermite-type mixture assists in the reaction as its acts as a propellant when heated to help force the thermite-type mixture into the clearance space between the reinforcement bars and the inner sleeve. A further factor to be considered when using a thermite-type coupler is the size of the entry hole since too large a hole allows for too violent a flow of thermite-type mixture while too small a hole can clog easily with solidified reaction products. An additional factor to be considered is the amount of clearance between the reinforcement bars and the inner sleeve. A tight clearance aids the splicing of the bars as it acts to resist the flow of the thermite-type mixture during the reaction thus keeping the reaction products around the reinforcement bars. Too great a clearance allows the reaction products to blow out the annulus. A means of stagnating the flow of the thermite-type mixture during the reaction is to increase the length of the inner sleeve to offer more flow resistance. It has also been found that texturing the inside of the inner sleeve allows for a more mechanical grip of the solidified reaction products on the reinforcement bars. Another major problem to contend with when using this type of coupling device is the considerable variance in the diameter of reinforcement bars to be joined. The annular space between the inner sleeve and the reinforcement bars must be small in order to prevent the reaction products from blowing out the ends of the annular space. This requirement of a close fit between the inner sleeve and the reinforcement bars becomes more acute when joining larger size reinforcement bars due to the considerable variations in the configurations and height of the ridges on the reinforcement bars.

SUMMARY

It is an object of this invention to disclose improvements to the aforementioned thermite-type reinforcement bar coupler suitable for the binding of both large and small reinforcement bars where the closeness of the fit of the reinforcement bars within the inner sleeve is not critical to the formation of the bond. The bonding of both large and small reinforcement bars is accomplished by causing the pressure drop of the thermite-type reaction to occur before the reaction products enter the annular space so that the reaction products will not blow out through the larger spaces created by the imprecise fit of the reinforcement bars within the inner sleeve of the coupler.

The improved device of this invention provides for a multiplicity of perforations distributed over the surface of the inner sleeve forming a perforated inner sleeve. When these perforations are of the proper size, they create most of the flow resistance to the thermite-type reaction and consequently the reaction products' pressure drop occurs before the reaction products such as iron and slag enter the annular space between the inserted reinforcement bars and the inner sleeve and the reaction products therefore remain inside the inner sleeve and are deposited onto the reinforcement bars. A further advantage of the perforated inner sleeve is that the thermite-type reaction products can be deposited directly onto the reinforcement bars without having to travel from the single or small number of larger entry holes utilized in the prior art along the annular space between the inserted reinforcement bars and the inner sleeve. If the inner sleeve perforations are of too small a size they can become clogged with the thermite-type reaction products before a sufficient amount has passed through to the annular space to form a proper bond. To overcome this problem, each perforation in the perforated inner sleeve can be tapered toward the annular space. A tapered perforation reduces the cooling of the reaction products as they pass through the perforation thereby preventing clogging. In a further embodiment the perforations in the inner sleeve can be replaced by a plurality of cavities, the mouth of each cavity facing the thermite-type mixture containing area of the coupler. In this embodiment the size of each cavity can be larger than one of the perforations described above. In the embodiment utilizing a plurality of cavities in the inner sleeve when the fuse located in the outer sleeve is ignited, the thermite-type reaction melts the portion of the inner sleeve at the base of each cavity which base is of sufficient thinness so as to melt during the thermite-type reaction. The melting of this thin portion of the inner sleeve at the base of each cavity draws energy from the ongoing reaction causing the thermite-type reaction products' pressure drop to occur while the thermite-type reaction products are melting through the portion of the inner sleeve at the base of each cavity and flowing through the resulting perforation in the inner sleeve and entering the annular space causing the reacton products to be deposited around the bars to be joined. A further embodiment of this invention incorporates the use of an aluminum sleeve or sleeve of a material having a similarly low melting point affixed to the inner sleeve positioned between the inner sleeve and the bars to be joined whereby the reaction products passing through the perforations in the inner sleeve must melt the aluminum or equivalent material before the reaction products enter the annular space between the inner sleeve and the reinforcement bars similarly causing the reactions's pressure to drop before the reaction products enter the annular space. This configuration can allow larger thermite entry perforations to be used since the reaction products will expend energy and cool on melting the aluminum sleeve or sleeve of equivalent material and further, when an aluminum sleeve is used, the aluminum will melt and provide an additional material in the formation of the bond joining the bar-like structures together.

DESCRIPTION OF THE PREFERRED EMBODIMENT

Figure 1:
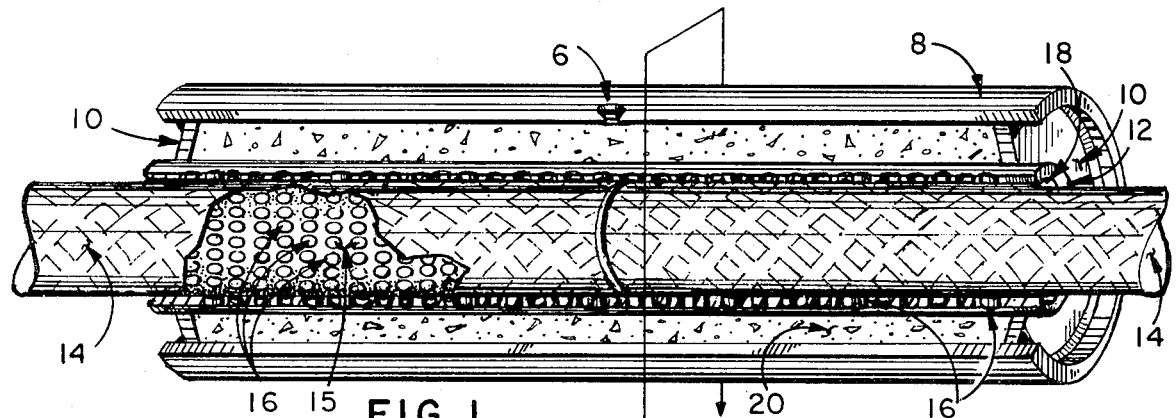
FIG. 1 is a perspective cross-sectional view of the coupler device of this invention having a perforated inner sleeve.

FIG. 1 illustrates a cross-sectional view of the coupler device of this invention having inner sleeve 12. Seen in this view is outer sleeve 8 and collar members 10 joining it to inner sleeve 12. Collar members 10 can be affixed to the inner sleeve 12 and outer sleeve 8 by welding, by crimping the ends of the outer sleeve 8 or by equivalent attachment means. The sleeve members and collars can be composed of iron or equivalent material. The space between outer sleeve 8 and inner sleeve 12 forms thermite-type mixture holding area 20. Fuse 6 is seen leading from the outside of outer sleeve 8 into thermite holding area 20 and is utilized to ignite the thermite-type mixture. Seen inserted into annular space 18 of the coupler device are reinforcement bars 14. Other equivalent bar structures can also be spliced by this coupler. Inner sleeve 12 has a multiplicity of perforations 16 to allow the entry of the thermite-type reaction products into annular space 18 to be deposited on reinforcement bars 14 thereby splicing them together along with the coupler. Perforations 16 along the inside of inner sleeve 12 are also visible where reinforcement bar 14 is cut away for the sake of illustration at area 15.

Figure 2:
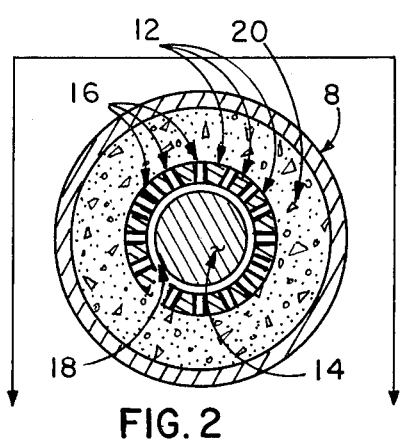
FIG. 2 is a sectional view through Section A — A of a FIG. 1.

FIG. 2 is a sectional view through Section A — A of FIG. 1 showing outer sleeve 8, thermite-type mixture holding area 20, inner sleeve 12 having perforations 16, and annular space 18 within which reinforcement bars 14 are inserted.

Figure 3:
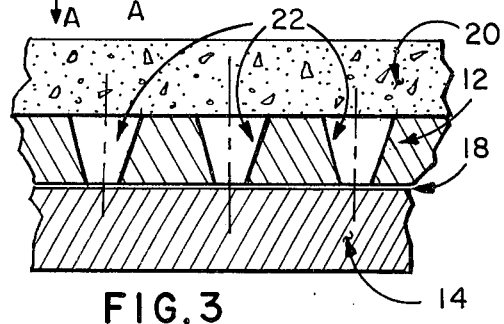
FIG. 3 is an enlarged segment of a cross-sectional view of the embodiment utilizing tapered perforations.

FIG. 3 illustrates an enlarged segment of a cross-sectional view of the embodiment utilizing tapered perforations within the inner sleeve. Shown are tapered perforations 22 in inner sleeve 12 between thermite-type mixture holding area 20 and annular space 18. The tapered perforations are tapered in shape toward annular space 18.

Figure 4:
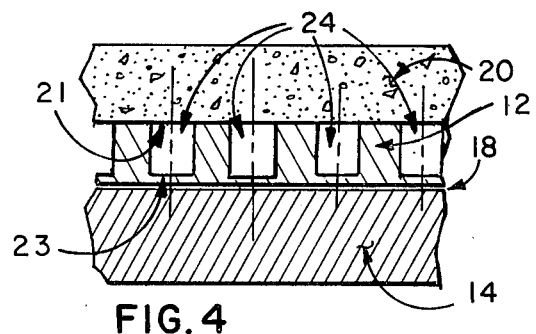
FIG. 4 is an enlarged segment of a cross-sectional view of an embodiment utilizing cavities within the inner sleeve.

FIG. 4 is an enlarged segment of a cross-sectional view of an embodiment utilizing cavities within the inner sleeve. Cavities 24 do not extend completely through inner sleeve 12 to annular space 18. Each cavity has mouth 21 and base 23.

Figure 5:
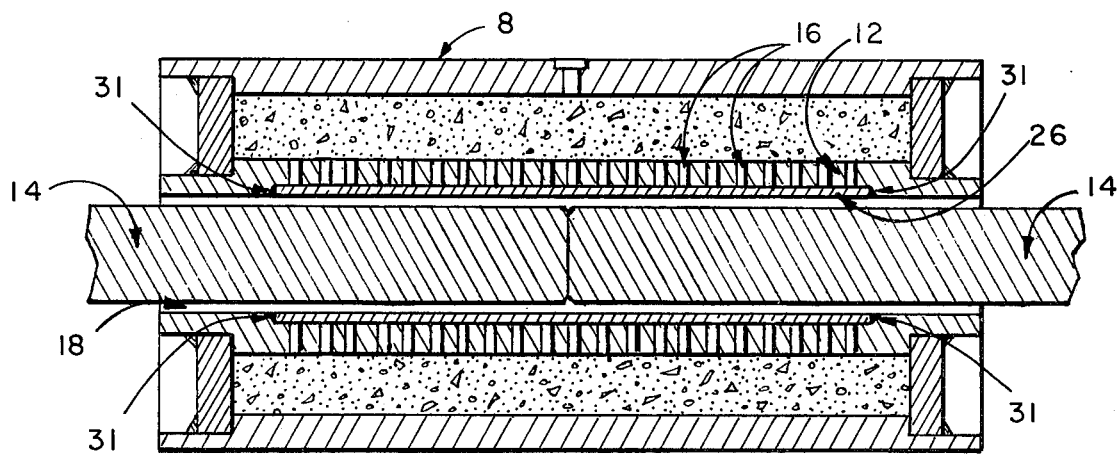
FIG. 5 is a cross-sectional view of the device of this invention illustrating a perforated inner sleeve having an aluminum sleeve affixed thereto.

FIG. 5 illustrates an embodiment of the coupler device of this invention having aluminum sleeve 26 or sleeve of equivalent material having a low melting point concentrically affixed to inner sleeve 12 so that it covers all perforations 12 in inner sleeve 12. Aluminum sleeve 26 can be affixed by welding or equivalent means to inner sleeve 12. The embodiment illustrated shows aluminum sleeve 26 welded to inner sleeve 12 along its ends 31.

Although the present invention has been described with reference to particular embodiments, it will be apparent to those skilled in the art that variations and modifications can be substituted therefor without departing from the principles and spirit of the invention.

I claim:

1. An improved thermite-type coupler for the splicing of bar-like structures such as reinforcement bars, of the type having an outer sleeve; an inner sleeve located within said outer sleeve; two collar members, each joining one end of said outer sleeve to one end of said inner sleeve; the region defined between said inner sleeve and said outer sleeve containing a thermite-type mixture and the region within said inner sleeve forming an annular space utilized for insertion of the ends of two bar-like sturctures, including means for igniting said thermite-type mixture and means for allowing the reaction products of the thermite-type mixture after it is ignited to enter said annular space under pressure so as to cause upon solidification of the reaction products, splicing of said bar-like structures, wherein the improvement comprises:

an inner sleeve having a multiplicity of perforations therethrough distributed over a substantial portion of its surface, each of said perforations being of a size sufficiently large to allow said reaction products to flow therethrough and of a size sufficiently small to cause the pressure of said activated thermite reaction products as they enter the annular space to be substantially lower than the pressure of said reaction products in the region between the inner and outer sleeves, each of said perforations being tapered so as to have a decreasing cross-sectional area in the vicinity of said annular space.

2. An improved thermite-type coupler for the splicing of bar-like structures such as reinforcement bars, of the type having an outer sleeve; an inner sleeve located within said outer sleeve; two collar members, each joining one end of said outer sleeve to one end of said inner sleeve; the area defined between said inner sleeve and said outer sleeve containing a thermite-type mixture and the area within said inner sleeve forming an annular space utilized for insertion of the ends of two of said bar-like structures including means for igniting said thermite-type mixture and means for allowing said thermite-type reaction products after ignition to enter said annular space under pressure thereby, upon solidification, splicing said bar-like structures together having the improvement wherein said means for allowing said thermite-type reaction products after ignition to enter said annular space comprises said inner sleeve having a multiplicity of cavities defined therein, the mouth of each of said cavities facing toward said thermite-type mixture containing area and the portion of the inner sleeve at the base of each cavity arranged to be of sufficient thinness so as to melt during said thermite-type reaction to cause said thermite-type reaction products' pressure drop to occur while said thermite-type reaction products are melting through said base and flowing through the resulting perforation in said inner sleeve to enter said annular space.

3. An improved thermite-type coupling device of the type having inner and outer coextensive sleeves, displaced somewhat and joined at their ends to contain an exothermic thermite-type reaction mixture therebetween, for the splicing of the ends of reinforcement bar-like structures insertable within and surrounding said inner sleeve wherein the improvement comprises:
   an inner sleeve having a multiplicity of perforations therethrough distributed over a substantial portion of its surface; and
   a sleeve member composed of material having a low melting point positioned and affixed in coextensive contact with the inner periphery of said inner sleeve to cover all of said perforations of said inner sleeve.

4. A device as recited in claim 3 wherein said sleeve member is made of aluminum.

* * * * *